April 30, 1968    H. VRANIAN    3,380,914

SELECTIVE ABSORPTION SYSTEM

Filed Aug. 23, 1965    2 Sheets-Sheet 2

INVENTOR
Henry Vranian
BY *Jacobi E. Davidson*
ATTORNEYS

United States Patent Office 3,380,914
Patented Apr. 30, 1968

3,380,914
SELECTIVE ABSORPTION SYSTEM
Henry Vranian, West Point, Va., assignor to The Chesapeake Corporation of Virginia, a corporation of Virginia
Filed Aug. 23, 1965, Ser. No. 481,623
15 Claims. (Cl. 208—188)

ABSTRACT OF THE DISCLOSURE

A system for selectively absorbing a liquid from a mixture of the same with at least one additional liquid by contacting the mixture with a material predominantly comprised of monoaxially compressed wood pulp. The monoaxially compressed wood pulp has a greater affinity for certain liquids, particularly water, than for other liquids and, as it selectively absorbs such liquids it expands monoaxially. Particular advantages are shown when selective absorption occurs by passing a mixture of the liquids through a block of the monoaxially expansible material which is free to expand axially, but transversely confined to preclude channelling.

---

This invention relates to a selective absorption system and relates more particularly to the selective absorption of a first liquid from a mixture of the same with at least one additional liquid. Although the basic concept of this invention is applicable to other materials, it is generally concerned with the removal of water from a mixture of the same with a substantially immiscible liquid or liquids and the description will therefore be limited to this particular system.

It will be readily recognized that there are many instances where the capability of removing water from a liquid mixture is desirable. For example, the presence of water in vehicle fuels, particularly gasoline, even in relatively small proportions, is known to cause great difficulties in the operation of internal combustion engines and the like. During cold winter months, such minute quantities of water can precipitate freezing in the gas line and be the source of poor starting of the engine. Similarly, in jet fuel, a small quantity of water can be the basis for malfunctions. Further, it is known that the presence of water in oil mixtures in transformers or starters are another source of trouble.

Frequently, it is desirable to separate the oil from water utilized in cleaning oil tankers and the like in order to recover the oil for further use.

In hydraulic systems where oil or various organic or semi-organic liquids such as silicone are utilized, the presence of water may necessitate purging the entire system and replacing the hydraulic fluid. Water in troublesome quantities will frequently condense in hydraulic systems of this type utilized in nuclear or other seagoing vessels. Similarly, laboratory reagents such as various organic reagents require removal of contaminating water absorbed during storage from the atmosphere.

Other and further uses of a selective absorption system such as disclosed herein will be obvious. Numerous attempts have been made heretofore to remove water from a liquid mixture, but generally these techniques have been unsatisfactory for one of a variety of reasons. Frequently, such prior art systems relay on certain characteristics of the materials in the mixture, such as, for example, a relatively large difference between the specific gravity of the water and the other liquid in question causing one of the materials to settle to the bottom of a storage system whereby separation may be effected. Such procedures are obviously limited in their application since they are only useful with mixtures of liquids having vastly different properties. Further, prior art approaches using such techniques are of poor efficiency in that extended periods of time are generally required for the separation and there must be no disturbance of the materials during the procedure. In other words, these procedures could not be utilized with a continuous system or one subject to sudden or frequent movement such as in an automobile fuel system.

Other approaches have utilized various filtering materials which had some ability to selectively absorb or block the passage of one of the liquids in the mixture, while permitting passage of the other. Techniques of this type have not been commercially satisfactory, in that once again, they were exceptionally limited in their application, generally functioning with only a small number of liquid mixtures. Additionally, they were inefficient in that the filtering medium only selectively absorbed small quantities of one liquid or reached its saturation point relatively quickly.

There is another and particularly important deficiency in prior art selective absorption systems based on separation of water from a mixture of the same with another liquid by contacting the mixture with a material capable of absorbing the water. Generally, the filtering or absorbing media known heretofore have had the characteristic of substantially uniformly expanding in all directions on absorption of the water. This propertly of prior art systems has made it relatively difficult to provide an arrangement wherein the mixture of liquids can be passed through or in intimate contact with the selective absorption material without unduly confining the material so that on expansion, after initial absorption of the water, large areas of the material are not compressed or clogged thereby losing their effectiveness, and, in fact, without resulting in blocking of the liquid flow therethrough.

If the absorption medium is placed in a cartridge through which the liquid is passed such as, for example, in a filter utilized in a fuel system for an automobile immediately before removal of the gasoline for feeding the same to the engine, or in a final filtering system interposed between a gasoline storage tank in a service station and the nozzle for feeding fuel therefrom into the gas tank of an automobile, sufficient room for expansion of the material must be provided in all directions in order to avoid the blocking effect described above. However, this generally permits at least a substantial portion of the liquid mixture being fed through the cartridge to bypass the absorption medium by channeling itself through paths of least resistance. Thus, the efficiency of such a system can be minimal at best.

It is a primary and basic object of this invention to provide a selective absorption system which is free from the foregoing and other disadvantages known to prior art techniques. Basically, it is the object of this invention to provide a means for selectively absorbing water from a mixture of the same with one or more relatively hydrophobic liquids with which it is substantially immiscible. It is to be understood that the term "immiscible" is utilized in the relative sense in that although the other liquid or liquids may have some solubility in water, they will not be completely miscible therewith.

A further and additional object of the instant invention is the provision of a selective absorption medium which is only monoaxially expansible in use whereby it may be readily confined in one direction to preclude channeling of the liquid mixture without contact by the medium while simultaneously allowing free expansion in a perpendicular direction in order that the medium is not compressed or clogged in use. In this matter a substantially continuous flow of liquid mixture may be passed through a cartridge to permit selective absorption of water from the mixture in an efficient manner and for an extended period. Additionally, if desired, a plurality of such cartridges may be utilized in series whereby increased absorption may be readily effected.

Although selective absorption of water may be effected from a mixture with any liquid with which it is substantially immiscible, improved results are realized when the other liquid is relatively hydrophobic. Further, selective absorption is more effective if the water is being removed from admixture with a relatively hydrophobic organic liquid having relatively low viscosity, density and surface tension. Each of these properties will have some relationship on the ability of the absorption medium to replace the other liquid or liquids which are normally present in major proportion in the mixture, the water more readily displacing the other liquid in these instances since the other liquid may have been previously absorbed by the separating medium and a more hydrophobic, less viscous and lower surface tension liquid will be easier for the water to displace.

Yet another object of this invention is to provide a selective absorption system which may simultaneously function to deodorize the material being treated. For example, in the event that a liquid mixture to be selectively absorbed has some undesirable odor, a particulate additive such as activated carbon or the like can be utilized in combination with the selective absorption system of this invention. In this vein, the preferred absorption medium takes the form of a substantially monoaxially compressed hydrophilic fibrous body which may have the activated carbon or other deodorant material substantially uniformly dispersed therein prior to compression. Although many fibrous materials such as cotton or the like are useful in the selective absorption medium of this invention, particularly advantageous is monoaxially compressed wood pulp, such as pulp in general which has been treated as would be conventional for preparation of pulp to be used in paper making. Such pulp generally comes from the pulp making machine with a water content of from 80 to 90 percent. This material is pressed to decrease its water content to about 50 percent, shredded and flash dried by sucking the same into a hot air stream, preferably in several stages, from which the fibrous material is collected in loose form and substantially monoaxially compressed to form an expansible body. Commercially, such material is marketed under the trademark "Xpandyne" by The Chesapeake Corporation of Virginia.

Monoaxially compressed hydrophilic fibrous materials such as "Xpandyne" are surprisingly found to selectively absorb water from a mixture of the type described at a faster rate and in a more efficient manner than prior art selective absorption media without becoming saturated for an extended period of time. Such materials will effectively remove water from a liquid mixture whether the water is present in small or large relative proportions. Further, the selective absorption properties of the material may be tailored to the specific application by varying its composition, its degree of compression, etc.

Other and further objects of this invention will in part be obvious and in part be pointed out as the description of the invention proceeds and as shown in the accompanying drawings wherein.

Like reference characters refer to like parts throughout the several views of the drawings.

Figure 1:
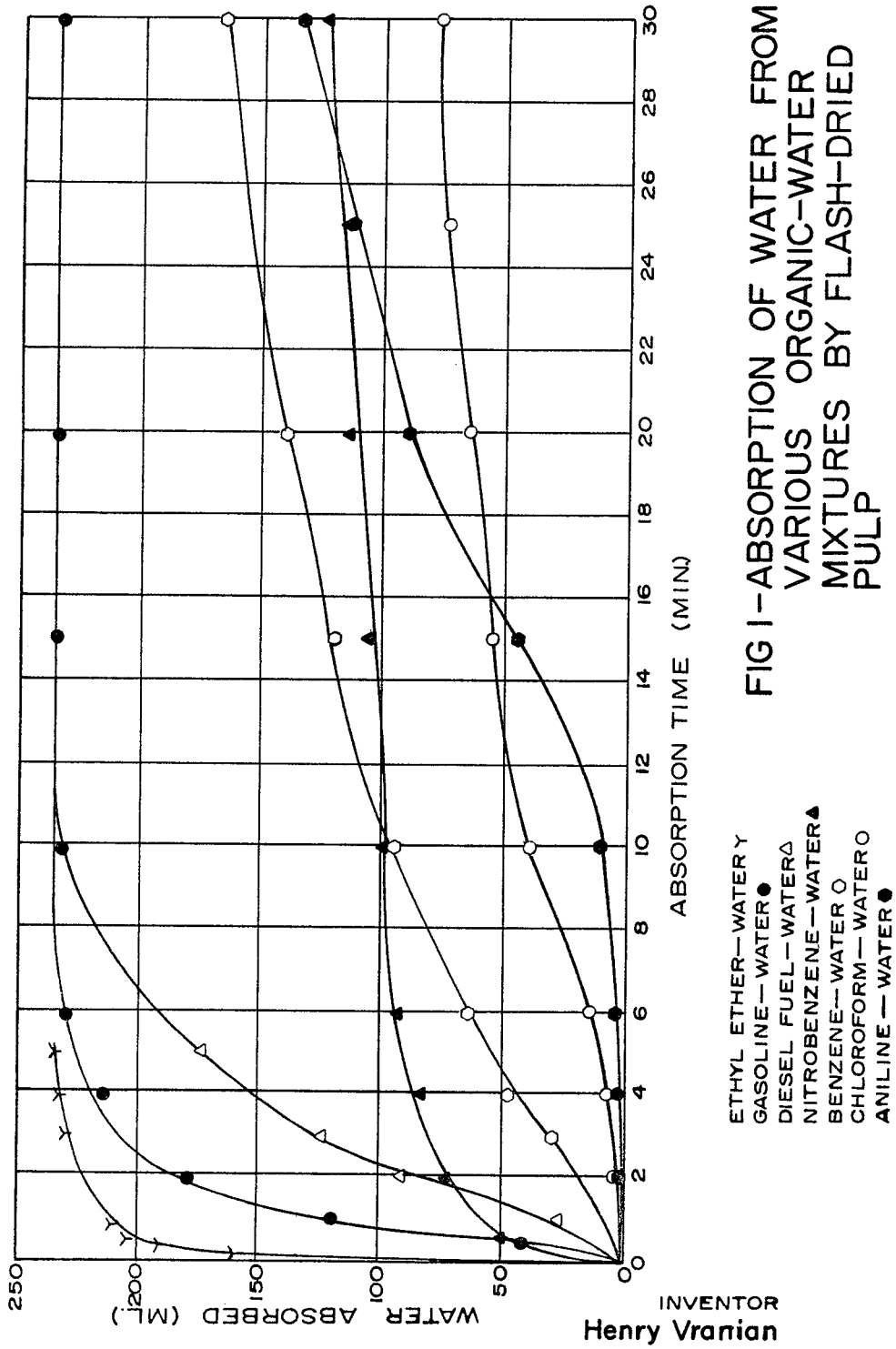
FIGURE 1 is a graph showing the selective absorption rate of water from various mixtures according to the instant inventive concept.

A number of laboratory tests were run to determine the degree and rate of water removal from mixtures of the same with various liquids by the monoaxially expansible hydrophilic fibrous bodies described above. Substantially 40 gram samples of the expansible material measuring 2" by 2" by 1" were soaked in the additional liquid for two hours to saturate the same therewith. In each instance, the blocks absorbed the additional liquid relatively rapidly, in as little as about two minutes, but two hours were selected to insure complete saturation. The saturated blocks were then placed in 600 milliliter beakers and sufficient amount of the additional liquid was added to the beaker to completely cover the block. Then 250 milliliters of water were rapidly added to the beaker and the samples were allowed to absorb the water for various periods of time after which the remaining mixture was poured into a separatory funnel and the water layer was drawn off and measured in a graduated cylinder. The amount of water remaining after each specified absorption time was recorded and the results of these tests are listed below in Table 1 and charted in FIGURE 1 of the drawings. This procedure was repeated at least three times for each liquid and where a large amount of variation was obtained between determinations with the same liquid, additional samples were run so a reliable average absorption would be obtained. In each instance, although there was some variation between samples in the amount of water absorbed in a given period of time, the majority of the variation was caused by differences in the compactness or density of the block and by the technique of measuring the water absorbed. The values shown in Table 1 and FIGURE 1 represent averages which are within from plus or minus 5 to 10 milliliters of the individual values.

TABLE 1

| Solution | Water Absorbed (ml.) after Various Times (min.) | | | | | | | | | | | | | |
|---|---|---|---|---|---|---|---|---|---|---|---|---|---|---|
| | ¼ | ½ | ¾ | 1 | 2 | 3 | 4 | 5 | 6 | 10 | 15 | 20 | 25 | 30 |
| Ethyl Ether | 158 | 190 | 207 | 217 | 227 | 232 | 234 | 236 | | | | | | 240 |
| Benzene | | | | | | 2 | 47 | | 66 | 96 | 122 | 142 | | 168 |
| Nitrobenzene | | 50 | | 63 | 75 | | 86 | | 94 | 102 | 108 | 115 | 120 | 125 |
| Aniline | | | | | 2 | | 3 | | 4 | 11 | 45 | 88 | 116 | 134 |
| Chloroform | | | | | 4 | | 8 | | 19 | 41 | 57 | 66 | 76 | 83 |
| Gasoline | | 43 | | 120 | 180 | | 215 | | 229 | 232 | 238 | 237 | | 239 |
| Diesel Fuel | | 11 | | 28 | 91 | 124 | | 174 | | | 231 | | 239 | 241 |

The data obtained from the above tests show that the monoaxially expansible body absorbs water at different rates from various mixtures, but in each instance it will be seen that substantial quantities of water may be selectively absorbed by this medium. Although there are exceptions, it appears as if selective absorption occurs at a greater rate from organic liquids which are relatively hydrophobic, of relatively low density, viscosity and surface tension. This trend is reasonable in that more energy would be required to displace a heavy, viscous liquid from the absorption medium than would be needed to replace a light, thin liquid. Additionally, selective absorption is generally limited to a mixture of water with further organic liquids which are not particularly miscible with the water. In each of these instances it was observed that the water-immiscible liquids do not expand the absorption medium to any significant degree, while the water caused substantial expansion monoaxially as the same was absorbed. No significant transverse expansion occurred during the selective absorption procedure.

It is concluded from the above results that the monoaxially expansible hydrophilic fibrous material will absorb water from such mixtures in a relatively short period of time. For example, such material absorbs more than five times its dry weight of water in approximately 10 minutes from a mixture of gasoline, diesel fuel or ethyl ether with water. Absorption from other mixtures was also substantial.

Variation of the above tests by utilizing smaller blocks of monoaxially expansible material showed that they absorbed a similar proportion of water relative to their weight.

Figure 2:
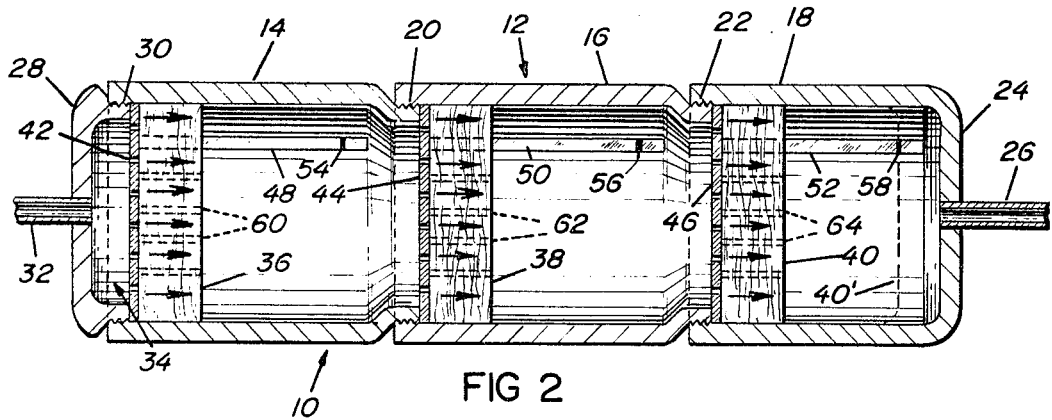
FIGURE 2 is a transverse cross-sectional view through one form of a filtering system utilizing a plurality of monoaxially expansible cartridges in series.

Having recognized the relatively large capacity of this material to absorb water from various mixtures therewith, FIGURE 2 is referred to for one embodiment of a system utilizing this property. A filtering or absorbing device is designated generally by the reference numeral 10 and comprises basically a housing means 12 which in the embodiment shown in FIGURE 2 is defined by a plurality of individual housing members 14, 16 and 18 threadably interengaged as at 20 and 22 with one housing member 18 having a substantially closed end 24 through which an inlet 26 communicates with a source of the liquid mixture to be treated. A manifold cap 28 is threadably secured at 30 to the housing member 14 to substantially close the opposite end of the system, and outlet 32 communicates with a manifold chamber 34 in this element.

Monoaxially expansible hydrophilic fibrous cartridges or bodies 36, 38 and 40 are received within each of the sections of the housing means generally in juxtaposition to a foraminous element such as the plates 42, 44 and 46 of the manifold cap 28 and the housing members 14 and 16. Transparent elements 48, 50 and 52 may be provided in each of the housing members, or the members themselves may be formed of a transparent material, indicia such as the markings 54, 56 and 58 preferably being provided in order to readily indicate to an operator when one of the cartridges has expanded fully such as shown by the dashed lines 40' in the housing member 18. In this manner, the cartridges act as automatic indicators since, depending upon their degree of compression, the amount of total expansion can be generally anticipated whereby the operator can readily determine when a particular cartridge is saturated. Of course, any additional indicating means may be included which are actuated by the cartridge on full expansion. In fact, it would be well within the ordinary skill of the art to design a system which would be automatically shut off as soon as any selected cartridge was fully expanded.

It will be recognized that the system shown in FIGURE 2 may use any number of cartridges in series, or may be limited to a single cartridge. The absorption capacity will of course be substantially increased by the addition of further cartridges.

One important feature of the system shown in FIGURE 2 is that due to the monoaxially expansible property of the absorbing medium, the same can be placed within a housing or confined within a chamber which is dimensioned to substantially conform with the transverse cross-sectional area of the cartridge while permitting free expansion of the cartridge along its axis of expansion as indicated by the plural arrows on each of the cartridges 36, 38 and 40. In this manner bypassing of the cartridges or channeling of the mixture can be precluded without clogging or blocking the peripheral areas of the cartridge as the same expands. In other words, if the cartridge were to expand substantially uniformly in all directions, the edge portions of the cartridge would relatively quickly be compressed against the sides of the housing thereby preventing any substantial flowthrough of the liquid mixture.

In the event that the expansible cartridges are precompressed to a degree where substantial liquid flowthrough is hindered to any undesirable extent, a multiplicity of small bores such as shown in dotted lines at 60, 62 and 64, may be provided to facilitate using the system.

It will also be understood that the cartridges utilized in the system of FIGURE 2 may have dispersed therethrough an odor absorbing material such as, for example, activated carbon particles or the like thereby simultaneously serving to remove both water and odor from the liquid mixture as the same is filtered.

The selective absorption system shown in FIGURE 2 will find many applications. For example, the device illustrated could be utilized as a final filter interposed between a bulk vehicle fuel storage tank, such as an underground gasoline or diesel fuel tank utilized in a service station, and the nozzle feeding the fuel into the vehicle fuel tank. In this manner, quantities of water condensed in the fuel due to the relatively cool location of the tank underground, can be removed before the fuel is dispensed.

Similarly, the system of FIGURE 2 may be utilized to remove water which has condensed in a hydraulic system such as the silicone systems found in nuclear submarines which precludes the necessity of completely purging the hydraulic medium and replacing the same. By merely passing the hydraulic fluid through a selective absorption system such as shown in FIGURE 2 the hydraulic medium may be reused. Other similar functions for such a system will be readily recognized by those with ordinary skill in the art.

It is to be understood that although the embodiment of FIGURE 2 has been described with regard to individual cartridges or preformed blocks of the monoaxially expansible hydrophilic fibrous material, similar results could be obtained from a selective absorption standpoint with the absorption medium in the form of shredded monoaxially compressed hydrophilic fibrous material or in other similar modified conditions.

Figure 3:
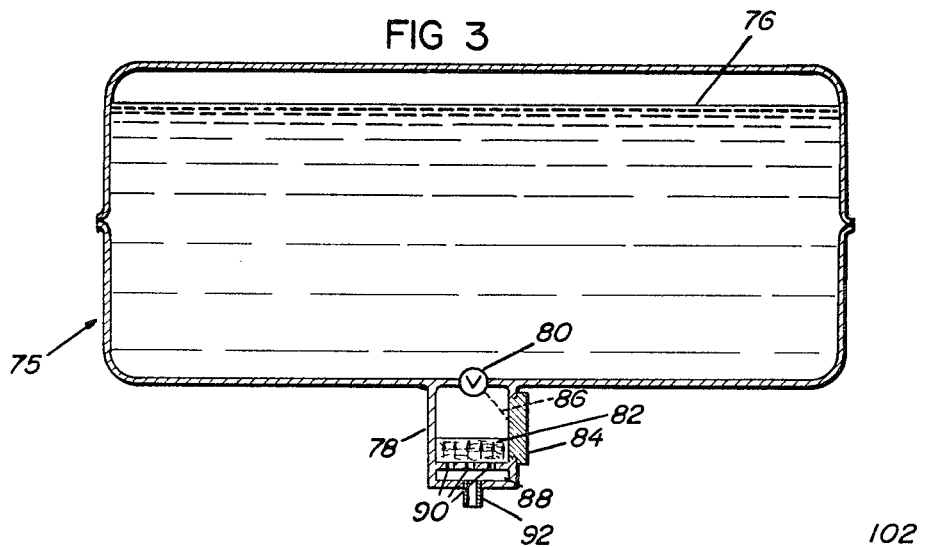
FIGURE 3 is a transverse cross-sectional view through a vehicle storage tank such as an automobile gasoline tank showing another use of the selective absorption system of this invention.

The use of the selective absorption system of the instant invention in a vehicle fuel tank will now be described with particular reference to FIGURES 3 and 4 wherein alternate embodiments of the same are shown. The embodiment of FIGURE 3 shows a cross-section through a conventional gasoline or diesel fuel tank designated generally by the reference numeral 75 and containing therein a quantity 76 of fuel, whether the same be gasoline or diesel fuel, in which some contaminating water may be mixed. The tank 75 carries a separate housing 78 communicating with the interior of the tank by means of a valve 80 which may be normally maintained closed and opened in any conventional manner when it is desired to dispense some fuel 76. A monoaxially compressed hydrophilic fibrous cartridge 82 is disposed within the housing 78 and a removable plug 84 may be carried by the housing to allow replacement of the cartridge when fully saturated. Any desired mechanical linkage schematically shown at 86 may interconnect the plug 84 with the valve 80 to insure that the latter is closed when the plug is removed. Preferably, a manifold chamber 88 communicates through a plurality of openings 90 with the interior of the housing 78 and with an outlet 92 connected to the fuel line feeding the engine.

The use and operation of the embodiment of FIGURE 3 will be obvious. As fuel is drawn through the cartridge 82, water will be absorbed causing monoaxial expansion of the cartridge. Any visual or mechanical monitoring system may be included to indicate to the operator when the cartridge is fully saturated with water. As shown in this embodiment channeling of the mixed fuel and water alongside the cartridge 82 is precluded and since the transverse expansion of the cartridge is insignificant, little or no clogging of the same will result.

Figure 4:
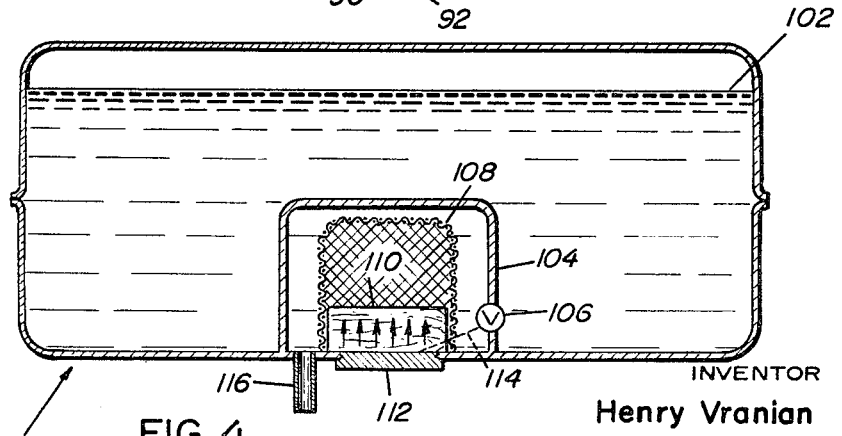
FIGURE 4 is a view similar to FIGURE 3 of a modified embodiment of absorption system for use with a vehicle fuel tank.

An alternate embodiment of a vehicle fuel system is shown in FIGURE 4 wherein the fuel tank is designated generally by the reference numeral 100 and contains a quantity 102 of fuel with some water contaminate therein. In this embodiment the liquid mixture is not passed through the cartridge, but rather is merely passed in contact therewith. A substantially imperforate housing 104 having a valve 106 similar to the valve 80 is provided within the tank 100. An internal foraminous housing 108 may be defined by a screen or the like and a monoaxially expansible hydrophilic fibrous cartridge 110 is disposed therein, the cartridge being replaceable by removing the plug 112 which may be operatively connected to the valve 106 by the mechanical linkage schematically shown at 114.

In this embodiment the liquid mixture is withdrawn from the tank 100 through the outlet 116 after having contacted the cartridge 110 whereby the contaminating water will be removed.

It is to be understood that the various constructions shown in the drawings are merely for illustrative purposes and are not in any way to be considered as limiting on the instant inventive concept. Various modifications and alternatives may be readily provided without the exercise of inventive skill. Further, various other uses for the selective absorption system of this invention will be obvious to the skilled artisan. For example, in a conventional oil storage tank one or more cartridges or quantities of the monoaxially expansible hydrophilic fibrous material may be included to maintain the same substantially free of water. In a relatively large storage tank cartridges of this typ may be carried at different levels, around the periphery and spaced throughout the tank, as desired. Similarly, quantities of the absorption medium may be utilized to remove water from receptacles normally used for various additional liquids and cleaned with water. The expansion rate may be readily varied by controlling the degree of initial compression and the quantity of absorption medium utilized.

The use of the term "absorption" throughout the instant specification and the appended claims is to be understood to be intended to mean the assimilation of liquid in any manner. It is not certain whether the entire function of the system of the instant invention is occasioned by conventional absorption characteristics or whether a portion of the selective separation results from adsorption phenomena and thus the term "absorption" has been used as generic to any sorptive action.

Thus, it will now be seen that there is herein provided an improved selective absorption system which satisfies all of the objects of the instant invention, and others, including many advantages of great practical utility and commercial importance. As pointed out hereinabove, many embodiments may be made of the instant inventive concept, and many modifications may be made of the embodiments hereinbefore shown and described. Therefore, all matter herein is to be interpreted merely as illustrative of certain of the applications of this concept.

What is claimed is:

1. A process for selectively absorbing a first liquid from a mixture of the same with a substantially immiscible hydrophobic liquid, comprising contacting said mixture with a substantially monoaxially expansible material having a greater affinity for said first liquid than for said additional liquid, said monoaxially expansible material consisting essentially of monoaxially compressed wood pulp.

2. A process for selectively absorbing water from a mixture of the same with at least one additional liquid which is substantially immiscible with said water, comprising contacting said mixture with a substantially monoaxially expansible hydrophilic material, said monoaxially expansible material consisting essentially of monoaxially compressed pulp.

3. The process defined by claim 2 wherein said material further includes, in minor proportion by weight, an odor-absorbing material.

4. The process defined by claim 3 wherein said odor-absorbing material consists essentially of activated carbon particles substantially uniformly dispersed in said material.

5. The process defined in claim 2 wherein said additional liquid is a relatively hydrophobic organic liquid.

6. The process of claim 2 wherein said additional liquid is a relatively low density organic liquid.

7. The process defined in claim 2 wherein said additional liquid is a relatively low viscosity organic liquid.

8. The process defined in claim 2 wherein said additional liquid is a relatively low surface tension organic liquid.

9. The process defined in claim 2 further including passing said mixture through said material generally in the direction of its axis of expansion, confining said material transversely of said axis thereby substantially precluding passage of said mixture outside of said material, and permitting substantially free expansion of said material along said axis thereby precluding obstruction of free passage of said mixture through said material.

10. A system for selectively absorbing a first liquid from a mixture of the same with a substantially immiscible hydrophobic second liquid comprising, selective absorption means comprising a substantially monoaxially expansible material having a greater affinity for said first liquid than for said second liquid, housing means enclosing said absorption means and at least one opening in said housing means for introducing said mixture into said housing means and contacting said absorption means therewith, and at least one opening in said housing means for removing said second liquid from said housing means, said monoaxially expansible material consisting essentially of monoaxially compressed wood pulp and defining a cartridge having an initial longitudinal dimension prior to expansion, a final longitudinal dimension following expansion and a substantially constant cross-sectional area transverse to its axis of expansion, said housing means having a longitudinal dimension in excess of said final longitudinal dimension of said cartridge and a substantially constant cross-sectional area conforming to said cross-sectional area of said cartridge, and said at least one opening for introducing said mixture into said housing means being so disposed that it feeds said mixture into said housing means and into contact with said cartridge.

11. The system of claim 10 wherein said at least one opening for introducing said mixture into said housing means is so disposed that it feeds said mixture into said housing means and through said cartridge.

12. The system of claim 10 in combination with a vehicle fuel tank, wherein said second liquid is vehicle fuel, said at least one opening for introducing said mixture into said housing means communicates with said vehicle fuel tank and said fuel is withdrawn from said system through said at least one opening for removing said second liquid and fed to the engine of the vehicle.

13. The system of claim 10 in combination with a bulk storage tank, wherein said first liquid is water, said second liquid is vehicle fuel, said at least one opening for introducing said mixture into said housing means communicates with said bulk storage tank and said fuel is withdrawn from said system through said at least one opening for removing said second liquid immediately before being fed into the fuel tank of a vehicle.

14. The system defined by claim 10 further including a plurality of spaced cartridges in series within said housing means.

15. The system defined in claim 10 wherein said second liquid is gasoline.

(References on following page)

References Cited

UNITED STATES PATENTS

| | | | |
|---|---|---|---|
| 2,315,372 | 3/1943 | Kressman | 252—427 |
| 1,569,695 | 1/1926 | Zoul | 208—188 X |
| 1,739,834 | 12/1929 | Gard et al. | 208—299 X |
| 1,840,164 | 1/1932 | Hirt | 208—299 X |
| 3,239,452 | 3/1966 | Van Beest et al. | 208—187 |
| 3,256,997 | 6/1966 | Pall et al. | 208—187 X |

FOREIGN PATENTS 223,495  10/1924  Great Britain.

OTHER REFERENCES

Uren: "Petroleum Production Engineering," 3rd edition, McGraw-Hill, New York, 1953, pp. 591–593.

DELBERT E. GANTZ, *Primary Examiner.*

G. J. CRASANAKIS, R. H. SHUBERT,
*Assistant Examiners.*